(12) United States Patent
da Fonte Dias et al.

(10) Patent No.: US 7,443,199 B2
(45) Date of Patent: Oct. 28, 2008

(54) CIRCUIT ARRANGEMENT FOR VOLTAGE SELECTION, AND METHOD FOR OPERATING A CIRCUIT ARRANGEMENT FOR VOLTAGE SELECTION

(75) Inventors: Victor da Fonte Dias, Neubiberg (DE); Florian Hus, Villach (AT)

(73) Assignee: Infineon Technologies AG, Munich (DE)

( * ) Notice: Subject to any disclaimer, the term of this patent is extended or adjusted under 35 U.S.C. 154(b) by 1 day.

(21) Appl. No.: 11/635,723

(22) Filed: Dec. 7, 2006

(65) Prior Publication Data

US 2007/0164614 A1 Jul. 19, 2007

(30) Foreign Application Priority Data

Dec. 7, 2005 (DE) .................. 10 2005 058 432

(51) Int. Cl.
*H03K 19/094* (2006.01)
*H03K 19/0175* (2006.01)
(52) U.S. Cl. .................. 326/68; 326/80; 326/81
(58) Field of Classification Search ............. 326/68, 326/80–81; 327/407–408
See application file for complete search history.

(56) References Cited

U.S. PATENT DOCUMENTS

| 5,341,034 A | * | 8/1994 | Matthews | ............. 327/534 |
| 5,929,615 A | | 7/1999 | D'Angelo et al. | |
| 6,774,704 B2 | * | 8/2004 | Kushnarenko | ............. 327/530 |
| 6,847,249 B1 | * | 1/2005 | Brokaw | ............. 327/408 |
| 6,879,134 B2 | | 4/2005 | Stanesti et al. | |

OTHER PUBLICATIONS

"Dual 2.6A, 2.5V to 5.5V, Ideal Diodes in 3mm×3mm DFN", Datasheet LT4413, Linear Technology Corporation, reprinted from the Internet at:, http://www.linear.com/pc/downloadDocument.do?navId=H0,C1,C1142,C1079,P7889,D5398, 12 pgs, no date.

"5.5-V I/O in a 2.5-V 0.25- μm CMOS Technology", Anne-Johan Annema, Govert J.G.M. Geelen and Peter C. De Jong, IEEE Journal of Solid-State Circuits, vol. 36, No. 3, Mar. 2001, pp. 528-538.

* cited by examiner

*Primary Examiner*—Anh Q Tran
(74) *Attorney, Agent, or Firm*—Eschweiler & Associates, LLC

(57) ABSTRACT

The circuit arrangement includes a first and a second input to supply a first and a second supply voltage and also an output. The circuit arrangement includes a first transistor, which is connected between the first input and the output, and a second transistor, which is connected between the second input and the output. The first and second transistors include a respective substrate connection coupled to a supply connection. In addition, the circuit arrangement includes a third and a fourth transistor, which are connected between the first input or the second input and the supply connection, and also a control circuit, which is coupled to the first and second inputs and to control connections of the first and second transistors.

20 Claims, 4 Drawing Sheets

CIRCUIT ARRANGEMENT FOR VOLTAGE SELECTION, AND METHOD FOR OPERATING A CIRCUIT ARRANGEMENT FOR VOLTAGE SELECTION

REFERENCE TO RELATED APPLICATIONS

This application claims the benefit of the priority date of German application DE 10 2005 058 432.2, filed on Dec. 7, 2005, the contents of which are herein incorporated by reference in their entirety.

FIELD OF THE INVENTION

The invention relates to the field of electronics and primarily to a circuit arrangement for voltage selection, to a use for the circuit arrangement for voltage selection and to a method for operating a circuit arrangement for voltage selection.

BACKGROUND OF THE INVENTION

Circuit arrangements for voltage selection are used to output an output voltage if more than one power source is available. This is often the case with battery operated systems. Such circuit arrangements can be used in power management units, PMU for short. One application example is a PMU for a mobile radio communication appliance, in which the PMU can change over between a battery voltage and a voltage which is provided by an external charger.

BRIEF DESCRIPTION OF THE DRAWINGS

The invention is explained in more detail below using a plurality of exemplary embodiments with reference to the figures.

FIGS. 4A and 4B show the first and second transistors with a control arrangement, wherein FIG. 4A shows the circuit and FIG. 4B shows an exemplary implementation in a semiconductor body.

DETAILED DESCRIPTION OF THE INVENTION

Components which have the same function or action bear the same reference symbols. Where circuit parts match in terms of components and in terms of their function, the description thereof is not repeated for each of the subsequent figures.

Figure 1A:
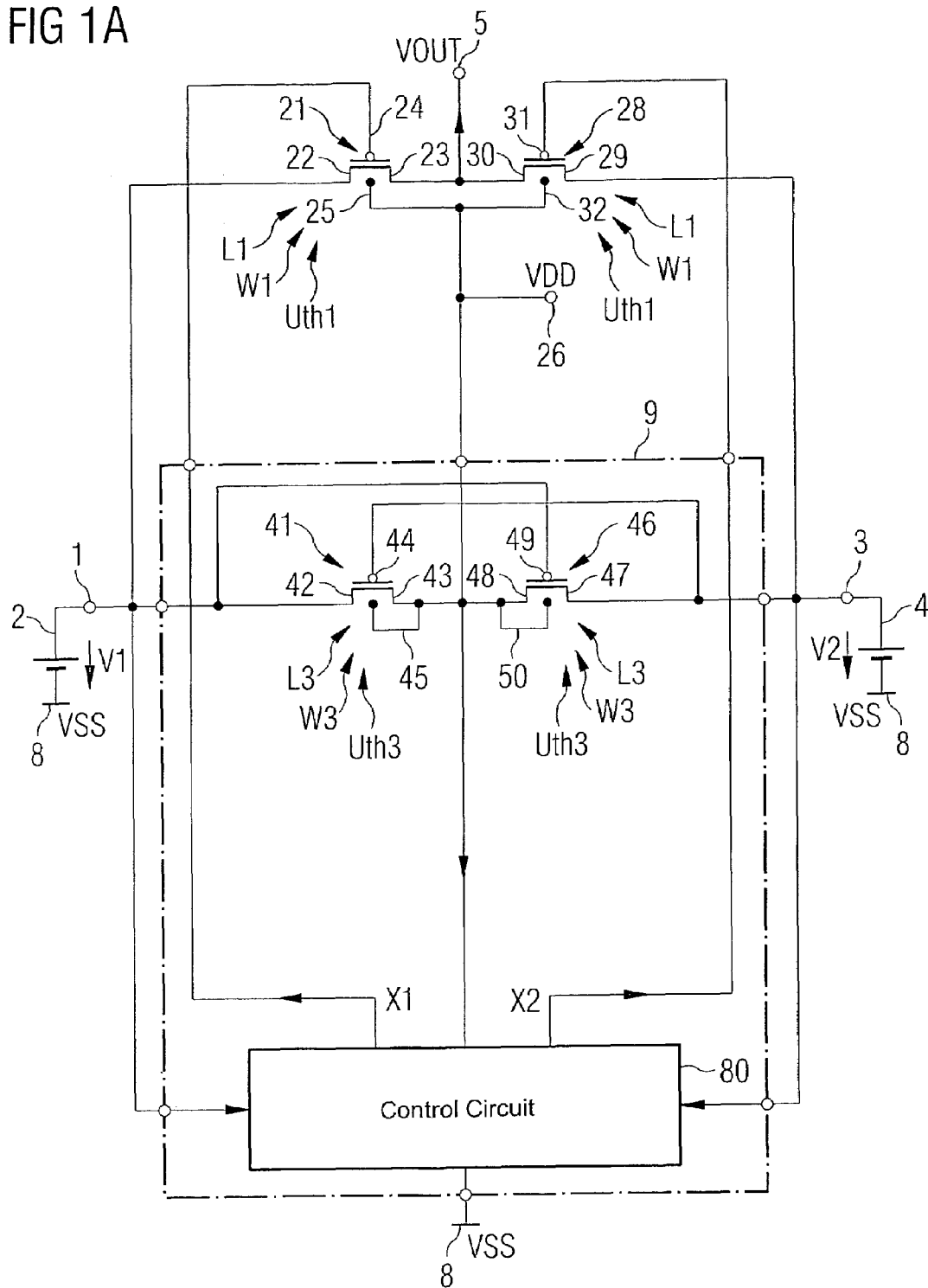
FIGS. 1A and 1B are schematic diagrams illustrating exemplary embodiments of a circuit arrangement for voltage selection.

FIG. 1A shows an exemplary embodiment of the circuit arrangement for voltage selection. The circuit arrangement comprises a first transistor 21, a second transistor 28, a third transistor 41, a fourth transistor 46 and a control circuit 80.

In one embodiment, the four transistors 21, 28, 41, 46 are respectively implemented as p-channel field effect transistors. A first connection 22 of the first transistor 21, a first connection 42 of the third transistor 41 and a control connection 49 of the fourth transistor 46 are connected to a first input 1 of the circuit arrangement. Accordingly, a first connection 29 of the second transistor 28, a first connection 47 of the fourth transistor 46 and a control connection 44 of the third transistor 41 are connected to a second input 3 of the circuit arrangement. A second connection 23 of the first transistor 21 and a second connection 30 of the second transistor 28 are connected to an output 5 of the circuit arrangement. A substrate connection 25 of the first transistor 21 and a substrate connection 32 of the second transistor 28 are connected to a supply connection 26. A second connection 43 and a substrate connection 45 of the third transistor 41 and a second connection 48 and a substrate connection 50 of the fourth transistor 46 are connected to one another and are likewise connected to the supply connection 26.

In one embodiment, the substrate connection 25 of the first transistor 21 and the substrate connection 32 of the second transistor 28 are directly and permanently connected to the supply connection 26.

In one embodiment, the first and second transistors 21, 28 have a first channel length L1, a first channel width W1 and a first threshold voltage Uth1. The third and fourth transistors 41, 46 have a channel length L3, a channel width W3 and a threshold voltage Uth3.

The inputs of the control circuit 80 are connected to the first and second inputs 1, 3 in one embodiment. A control connection 24 of the first transistor 21 and a control connection 31 of the second transistor 28 are connected to a respective output of the control circuit 80. The control circuit 80 is likewise connected to the supply connection 26 and to a reference potential connection 8.

A first power source 2 is connected between the first input 1 and the reference potential connection 8. Accordingly, a second power source 4 is connected between the second input 3 and the reference potential connection 8. The first power source 2 and hence the first input 1 can be used to tap off a first supply voltage V1. Accordingly, the second power source 4 and hence the second input 3 can be used to tap off a second supply voltage V2.

According to one embodiment, when the first supply voltage V1 or the second supply voltage V2 has been turned on, the lower of the two supply voltages V1, V2 turns on the third or the fourth transistor 41, 46, and the higher of the two supply voltages V1, V2 switches the third or the fourth transistor 41, 46 to a nonconductive operating state.

If the first supply voltage V1 is higher than the second supply voltage V2, for example, then the fourth transistor 46 is put into a nonconductive operating state and the third transistor 41 is put into a conductive operating state. In one embodiment, the first connection 42 and the substrate connection 45 of the third transistor 41 form a pn diode, which is forward biased provided that the first supply voltage V1 is larger than the substrate voltage VDD which can be tapped off at the supply connection 26. The pn diode in the first transistor 21, which is formed by the first connection 21 and the substrate connection 25 of the first transistor 21, can also carry a current if the first supply voltage V1 is larger than the substrate voltage VDD. A flow of current through the third transistor 41 and through the two pn diodes sets the substrate voltage VDD, and the voltage rises approximately to the value of the first supply voltage V1. The substrate voltage thus rises to the highest value which a voltage in the circuit arrangement for voltage selection has, and it can therefore be used to supply power to the substrate connections 25, 32, 45, 50 of the four transistors 21, 28, 41, 46 and to power the control circuit 80.

Should the second supply voltage V2 be larger than the substrate voltage VDD, then accordingly the diode which exists between the first connection 29 and the substrate connection 32 of the second transistor 28 and the diode which is present between the first connection 47 and the substrate connection 50 of the fourth transistor 46 are turned on. Should the second supply voltage V2 be larger than the first supply voltage V1 then the fourth transistor 46 is on and the third transistor 41 is off. Under these voltage conditions, these three current paths can be used to generate the substrate voltage VDD. This means that the parasitic diodes in the four field effect transistors 21, 28, 41, 46 and the channel in the third and fourth transistors 46 can be used in the conducting mode or in the subthreshold mode to bring the substrate voltage VDD to as high a value as possible. The substrate voltage VDD then acts on the first to fourth transistors 21, 28, 41, 46. It is provided to the control circuit 80, where it is provided for operating the gates and transistors in the control circuit 80.

The first and second supply voltages V1, V2 are likewise provided to the control circuit 80. The control circuit 80 is configured to output a first control signal X1 which is provided to a control connection 24 of the first transistor 21 in order to control the first transistor 21. In addition, the control circuit 80 is provided in order to output a second control signal X2, which is provided to the control connection 31 of the second transistor 28 in order to control the second transistor 28. Depending on whether the first or the second transistor 21, 28 is switched to a conducting operating state, the first or the second supply voltage V1, V2 is connected to the output 5 of the circuit arrangement and generates an output voltage Vout which can be tapped off at the output 5.

Advantageously, the third and fourth transistors 41, 46 are therefore used to produce a high voltage which can be used as the substrate voltage VDD for the first and second transistors 21, 28 and as the operating voltage for the control arrangement 80. Advantageously, the higher of the two supply voltages V1, V2 is provided to the output 5.

Figure 1B:
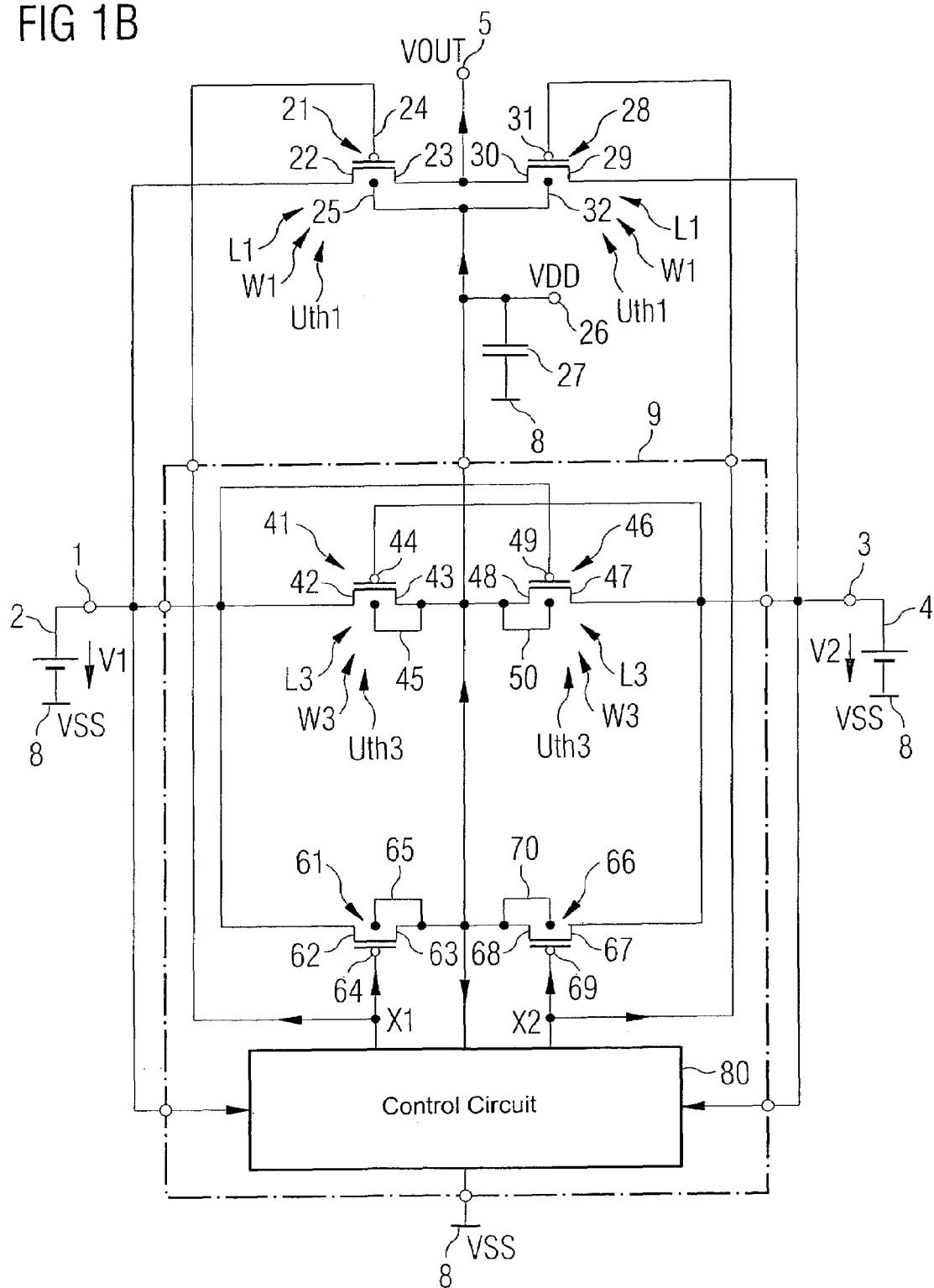

FIG. 1B shows an exemplary development of the circuit arrangement from FIG. 1A. The circuit arrangement shown in FIG. 1B comprises a fifth and a sixth transistor 61, 66 in addition to the circuit arrangement shown in FIG. 1A. The fifth transistor 61 comprises a first connection 62 connected to the first input 1 and comprises a second connection 63 connected to the supply connection 26. In addition, the sixth transistor 66 comprises a first connection 67 connected to the second input 3 and comprises a second connection 68 connected to the supply connection 26. A substrate connection 65 of the fifth transistor and a substrate connection 70 of the sixth transistor are likewise connected to the supply connection 26. A control connection 64 of the fifth transistor 61 and a control connection 69 of the sixth transistor 66 are coupled to a respective output of the control circuit 80. The supply connection 26 is coupled to the reference potential connection 8 via a hold capacitor 27. The fifth and sixth transistors 61, 66 are respectively implemented as p-channel field effect transistors in one embodiment.

The first control signal X1, which can be tapped off at the control circuit 80, is provided to the fifth transistor 61. Accordingly, the second control signal X2 provided by the control circuit 80 is supplied to the sixth transistor 66. The effect achieved by this is that a respective one of the two transistors, the fifth transistor 61 or the sixth transistor 66, is switched to a safely nonconductive operating state and the further transistor is switched to a conductive operating state.

The control circuit 80 is configured to provide the first and second control signals X1, X2 such that the difference between the voltage values of the first and second control signals X1, X2 is greater than the difference between the voltage values of the first and second supply voltages V1, V2. If the first supply voltage V1 is larger than the second supply voltage V2 then the first control voltage X1 is used to switch the fifth transistor 61 to a conductive operating state with a lower forward resistance than the third transistor 41. As a result of the low forward resistance of the fifth transistor 61, the substrate voltage VDD which can be tapped off at the supply connection 26 achieves virtually the voltage value of the first supply voltage V1. A similar situation applies to the case in which the second supply voltage V2 is larger than the first supply voltage V1.

Advantageously, all the substrate connections 25, 32, 45, 50, 65, 70 of the six transistors 21, 28, 41, 46, 61, 66 are therefore placed at the highest voltage value available in the circuit arrangement. The substrate connections 25, 32, 45, 50, 65, 70 of the six transistors 21, 28, 41, 46, 61, 66 are directly and permanently connected to each other and to the supply connection 26 in one embodiment.

One advantage of the hold capacitor 27 is that the substrate voltage continues to be at a high level even in the event of a brief fluctuation in the first or the second supply voltage V1, V2.

Alternatively, in another embodiment at least one of the six transistors 21, 28, 41, 46, 61, 66 may be implemented as a bipolar transistor.

Figure 2:
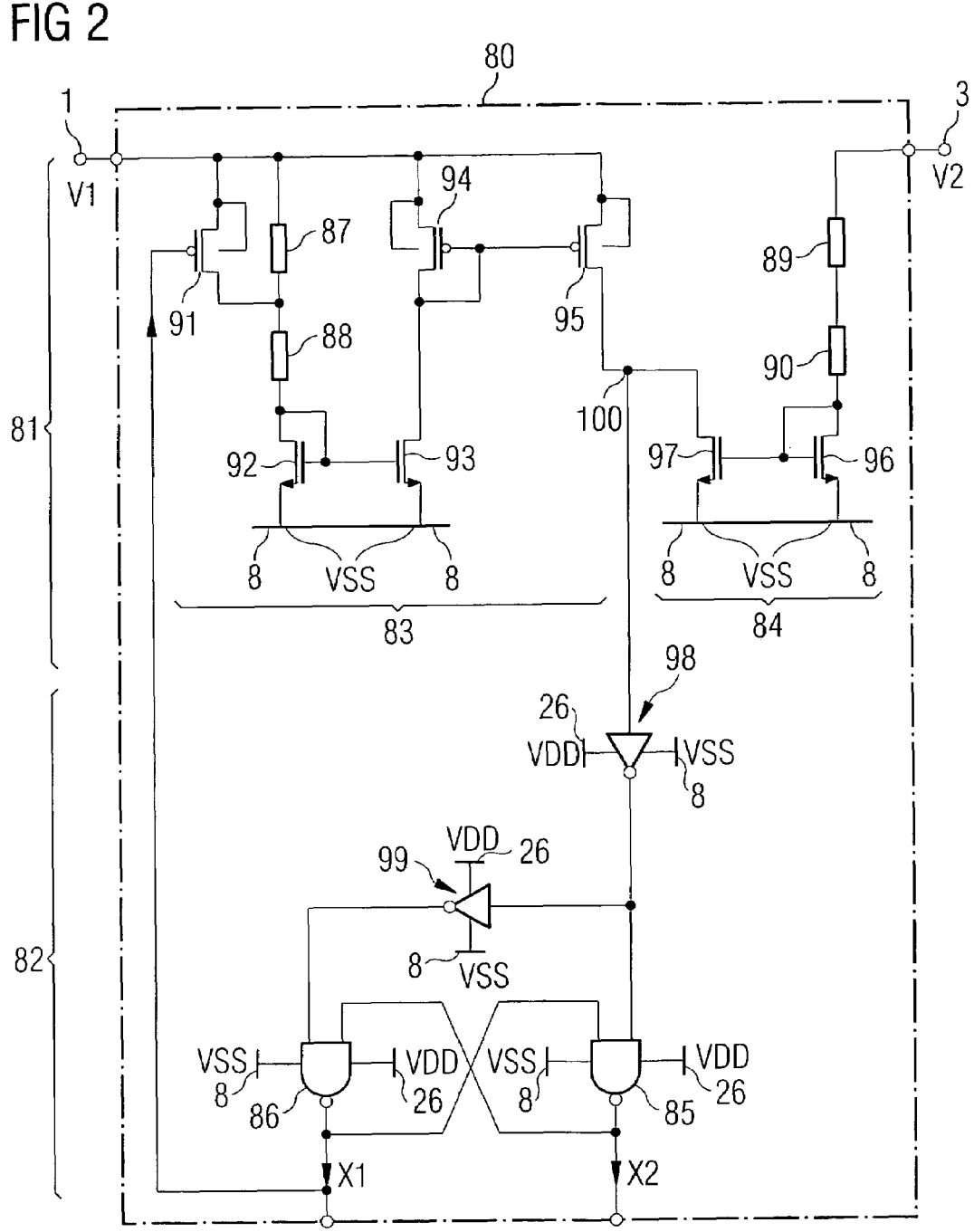
FIG. 2 is a schematic diagram illustrating an exemplary embodiment of a control circuit.

FIG. 2 shows an exemplary embodiment of the control circuit 80, as can be used in the circuit arrangements in FIGS. 1A and 1B. The control circuit 80 comprises a comparator 81 and a driver circuit 82 connected downstream of it. The comparator 81 comprises a first current source 83 and a second current source 84. The input of the first current source 83 is connected to the first input 1 and the input of the second current source 84 is connected to the second input 3.

The first current source 83 comprises a current mirror, comprising two transistors 92, 93, and a further current mirror, comprising two transistors 94, 95. A series circuit is connected between the first input 1 and the reference potential connection 8, wherein the series circuit comprises two resistors 87, 88 and the transistor 92. A first connection and a control connection of the transistor 92 are connected to one another and in addition are coupled to a control connection of the transistor 93. The first current source 83 comprises a further series circuit which is connected between the first input 1 and the reference potential connection 8 and which comprises the transistor 94 and the transistor 93. A connection of the transistor 94 is connected to a control connection of the transistor 94 and to a control connection of the transistor 95.

In one embodiment, the two transistors 92, 93 are implemented as n-channel field effect transistors, and the two transistors 94, 95 are implemented as p-channel field effect transistors.

The second current source 84 comprises a series circuit which is connected between the second input 3 and the reference potential connection 8 and which comprises two resistors 89, 90 and a transistor 96. A first connection of the transistor 96 is connected to a control connection of the transistor 96 and to a control connection of the transistor 97. The two transistors 96, 97 thus are comprised by a current mirror. A connection of the transistor 97 can therefore be used to tap off a second current.

The two transistors 96, 97 are implemented as n-channel field effect transistors in one embodiment.

The outputs of the first and second current sources 83, 84 are connected to a decision node 100. The decision node 100 forms the output of the comparator 81 and the input of the driver circuit 82.

In this exemplary embodiment, the driver circuit 82 comprises two inverters 98, 99 and two NAND gates 85, 86. The node 100 has the inverter 98 connected downstream thereof. The output of the inverter 98 is connected to an input of the NAND gate 86 via the further inverter 99. Similarly, the output of the inverter 98 is connected to an input of the NAND gate 85. An output of the NAND gate 85 is logically combined with a further input of the NAND gate 86. An output of the NAND gate 86 is connected for the purpose of feedback to a further input of the NAND gate 85. The output of the NAND gate 86 is connected to a control connection of a transistor 91 which is connected between the first input 1 and a node between the resistor 87 and the resistor 88.

The first current source uses the two resistors 87, 88 to convert the first supply voltage V1 into a current which the current mirror, comprising the transistors 92, 93, and the downstream current mirror, with the transistors 94, 95, translates into a current which can be tapped off at the output of the first current source 83.

The second supply voltage V2 is converted by the two resistors 89, 90 into a current which the current mirror, comprising the two transistors 96, 97, mirrors to the output of the second current source 84.

The potential on the decision node 100 rises if the first supply voltage V1 is larger than the second supply voltage V2. If the first supply voltage V1 is smaller than the second supply voltage V2, the potential on the decision node 100 falls.

The output of the NAND gate 86 can be used to tap off the first control signal. X1. The output of the NAND gate 85 can be used to tap off the second control signal X2.

The transistor 91 is used to short the resistor 87. The transistor 91 and the resistor 87 can be used to achieve a hysteresis in the switching response, so that when the values of the first supply voltage V1 and of the second supply voltage V2 are approximately the same there is no constant changeover or repeated switching between the two supply voltages V1, V2. Changeover from the first supply voltage V1 to the second supply voltage V2 is effected at V1=V2−ΔV, and the reverse changeover is effected at V1=V2+δV, where ΔV is a larger voltage in comparison with δV. The sum of the two voltages ΔV and δV thus produces the intended hysteresis window.

One advantage of this embodiment is that the first control signal X1 is used to turn on the first transistor 21 only if the second control signal X2 is being used to switch the second transistor 28 safely to a nonconductive operating state. This prevents both transistors 21, 28 from being in a conductive operating state at the same time.

If the first power source 2 has an internal resistance, then with a first transistor 21 in a conductive operating state the current flowing via the output 5 to an electrical load may result in a slight reduction in the first supply voltage V1. The hysteresis can advantageously be used to prevent the slight drop in the supply voltage V1 which is caused by the load current from prompting immediate changeover to the second power source 4. If the second power source 4 also has an internal resistance then, without hysteresis, approximately identical values for the first and second supply voltages V1, V2 would often prompt changeover from the loaded power source to the unloaded power source and constant switching to and fro or permanent switching. The hysteresis means that such switching to and fro is significantly reduced.

Figure 3:
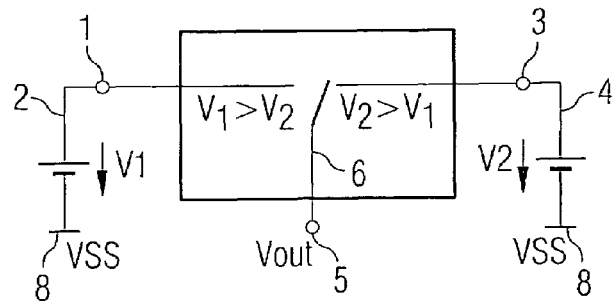
FIG. 3 Is a schematic diagram illustrating a basic diagram of the circuit arrangement for voltage selection.

FIG. 3 shows an embodiment of a basic diagram of the circuit arrangement. The circuit arrangement shown in FIG. 3 comprises a changeover switch 6 which selectively connects the first input 1 to the output 5 or the second input 3 to the output 5. The first input 1 is connected to the reference potential connection 8 via the first power source 2. The second input 3 is accordingly connected to the reference potential connection 8 via the second power source 4. The first power source 2 can be used to tap off the first supply voltage V1. Accordingly, the second power source 4 can be used to tap off the second supply voltage V2.

If the first supply voltage V1 is larger than the second supply voltage V2 then the changeover switch 6 couples the first input 1 to the output 5, which can be used to tap off the output voltage Vout. If, by contrast, the second supply voltage V2 is larger than the first supply voltage V1 then the changeover switch 6 couples the second input 3 to the output 5 of the circuit arrangement.

One advantage of the circuit arrangement shown in FIG. 3 with a changeover switch is that no more than one of the power sources 2, 4 can be connected to the output, which means that a short circuit between the first and second power sources 2, 4 can be prevented. An advantage of the changeover conditions is that the power source with the higher voltage is connected to the output 5 of the circuit arrangement, so that an electrical load which can be coupled to the output 5 can have the higher of the two supply voltages V1, V2 applied to it.

Figure 4A:
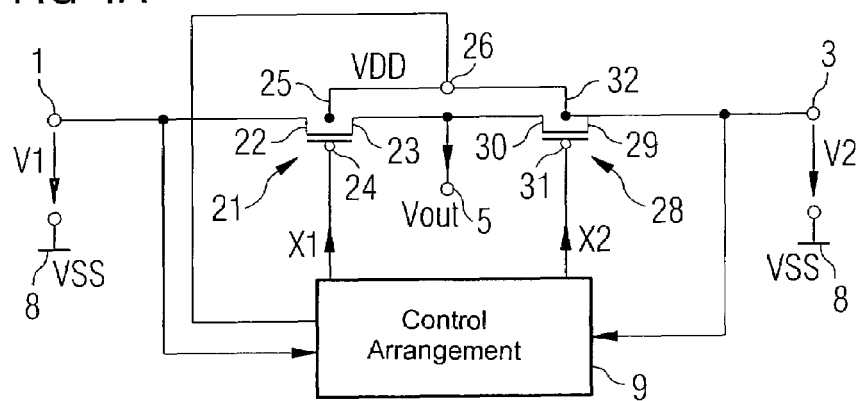
Figure 4B:
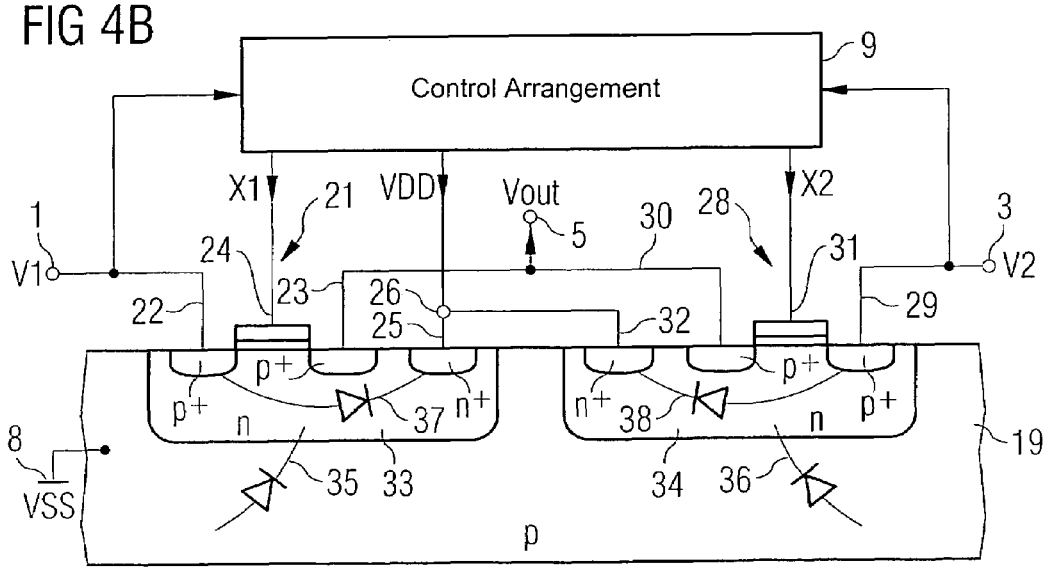

FIGS. 4A and 4B show the first and second transistors 21, 28 in a circuit diagram and in a cross section through a semiconductor body in exemplary embodiments.

FIG. 4A shows the first transistor 21 and the second transistor 28 in line with the circuit arrangements in FIG. 1A and FIG. 1B. The first and second transistors 21, 28 are implemented as p-channel field effect transistors in this embodiment.

A control arrangement 9 is provided in the circuit arrangement shown in FIG. 4A and has its inputs connected to the first and second inputs 1, 3. The outputs of the control arrangement 9 are connected to the control connections 24, 31 of the first and second transistors 21, 28. The substrate connections 25, 32 of the first and second transistors 21, 28 are connected to one another at the connection 26 and to the control arrangement 9.

FIG. 4B shows a cross section through the first and second transistors 21, 28 according to one embodiment. The first and second transistors 21, 28 are implemented as p-channel field effect transistors. The first and second connections 22, 23, 29, 30 of the two transistors 21, 28 are therefore in the form of p+ regions. The p+ regions of the first transistor 21, also called source connection and drain connection, are in an n-doped region 33, known as the n well. The p+ regions of the second transistor 28 are in a further n region 34, hence a further n well. The n well 33 is connected to the supply connection 26 via a substrate connection 25 which comprises a highly doped n+ region. Similarly, the n region 34 is connected to the supply connection 26 via a substrate connection 32 in the form of an n+ region. The two n wells 33, 34 are in a p-doped semiconductor body 19. The semiconductor body 19 is connected to the reference potential connection 8. Since the two n wells 33, 34 are at a higher potential in comparison with the semiconductor body 19 by virtue of a highest possible positive voltage on the substrate connections 25 and 32, the two diodes 35, 36 between the semiconductor body 19 and the n well 25 or the n well 32 are reverse biased.

In the event of a turn-on operation for the first or second supply voltage V1, V2, a diode 37, which is formed between the first connection 22 of the first transistor 21 and the substrate connection 25 of the n well 33, and a diode 38, which is formed between the first connection 29 of the second transistor 28 and the substrate connection 32 of the n well 34, may be briefly on until the substrate voltage VDD virtually reaches the higher of the two values of the first and second supply voltages V1, V2.

The effect advantageously achieved by this is that these parasitic diodes 37, 38 mean that the first and second transistors 21, 28 contribute to set the substrate voltage VDD in the event of a turn-on operation for the first and/or the second power source 2, 4.

In one embodiment, the circuit arrangement for voltage selection comprises a first, a second, a third and a fourth transistor and also a control circuit. The first transistor connects a first input to an output of the circuit arrangement. Accordingly, the second transistor connects a second input to the output of the circuit arrangement. The third transistor connects the first input to a supply connection. Accordingly, the fourth transistor connects the second input to the supply connection. The supply connection is connected to a substrate connection of the first transistor and to a substrate connection of the second transistor. The control circuit comprises inputs which are coupled to the first input, to the second input and to the supply connection. In addition, the control circuit comprises outputs which are connected to a control connection of the first transistor and to a control connection of the second transistor.

The first input is used to supply a first supply voltage. Accordingly, the second input is used to supply a second supply voltage. The first transistor is provided for the purpose of connecting the first supply voltage to the output of the circuit arrangement, at which an output voltage can be output. Accordingly, the second transistor is used for the purpose of connecting the second supply voltage to the output of the circuit arrangement. Whether the first transistor or the second transistor makes the connection, that is to say is put into a conductive operating state, can be set by the control circuit. The third and fourth transistors provide a substrate voltage which can be tapped off at the supply connection. The connection of the substrate connections of the first and second transistors to the supply connection routes the substrate voltage to the first and second transistors.

Advantageously, a loss of voltage when supplying the first or the second supply voltage to the output of the circuit arrangement is kept small by virtue of one respective component, namely the first or the second transistor, being situated in the current path from the first or the second input to the output of the circuit arrangement. Advantageously, the third and fourth transistors are used to set a substrate voltage which is sufficient so that the first and second transistors can operate.

In one embodiment, the control circuit outputs a first control signal, which can be supplied to the control connection of the first transistor, and outputs a second control signal, which can be supplied to the control connection of the second transistor.

In one embodiment, the control circuit takes a comparison between the first supply voltage and the second supply voltage as a basis for outputting the first and second control signals.

In one embodiment, the first input of the circuit arrangement is designed to be coupled to a first voltage source, at which the first supply voltage can be tapped off, and the second input of the circuit arrangement is configured to be coupled to a second voltage source, at which the second supply voltage can be tapped off.

In one embodiment, the first and second transistors are implemented as field effect transistors. One advantage of field effect transistors is that following the conclusion of a switching operation virtually no current has to be supplied to the control connection of the field effect transistor.

The first and second transistors may be implemented as n-channel field effect transistors. The first and second transistors may be implemented as normally-on p-channel field effect transistors.

In one embodiment, the first and second transistors are implemented as normally-off p-channel field effect transistors. With a voltage on the control connections of the field effect transistors at the level of a positive value of the first supply voltage or of the second supply voltage, the normally-off p-channel field effect transistor is advantageously switched to a nonconductive operating state. Another advantage of this embodiment is that with a potential on the control connections of normally-off p-channel field effect transistors at the level of the reference potential, the field effect transistors conduct even better the higher the positive value of the first or of the second supply voltage is.

In one embodiment, the first and second transistors comprise power components.

In one embodiment, the third and fourth transistors may be implemented as normally-off p-channel field effect transistors. In this case, the third transistor may comprise a control connection connected to the second input of the circuit arrangement and may comprise a substrate connection connected to the supply connection. Accordingly, the fourth transistor may comprise a control connection connected to the first input and may comprise a substrate connection connected to the supply connection.

At first, a substrate voltage which is between the first supply voltage and the second supply voltage becomes established on the supply connection. Depending on the voltage conditions, various currents may contribute to the formation of the substrate voltage on the supply connection. When the first, the second, the third and the fourth transistors are implemented as normally-off p-channel field effect transistors, current can firstly flow to the supply connection through forward biased diodes between the first connection and the substrate connection of one of the four transistors and also through the diode between the second connection and the substrate connection of one of the four transistors. Secondly, a current can flow from the first to the second connection of the third and fourth transistors, known as the source-drain current, above and below the threshold voltage. These effects prompt automatic production of the substrate voltage.

In one embodiment, the current carrying capacity of the first and second transistors is the same and respectively greater than the current carrying capacity of the third and fourth transistors.

In one embodiment, the first and second transistors have a channel width to channel length ratio which is larger than a channel width to channel length ratio of the third and fourth transistors.

In one embodiment, the first, the second, the third and the fourth transistor are implemented as normally-off p-channel field effect transistors which have the same threshold voltage. In an alternative embodiment, the third and fourth transistors may have a threshold voltage whose absolute value is lower than that of a threshold value for the first and second transistors. This means that the substrate voltage is advantageously set earlier than the first or the second transistor's being turned on.

In one alternative embodiment, the third and fourth transistors may be implemented as bipolar transistors. In this embodiment, the third transistor may comprise a control connection and a first connection connected to the first input. Accordingly, the fourth transistor may comprise a control connection and a first connection connected to the second input. A second connection of the third transistor and a second connection of the fourth transistor may be connected to the supply connection in this embodiment.

In one embodiment, the circuit arrangement comprises a fifth and a sixth transistor. The fifth transistor is connected up to connect the first input to the supply connection, and comprises a control connection connected to the control circuit. Accordingly, the sixth transistor is connected up to connect the second input to the supply connection, and comprises a control connection likewise connected to the control circuit.

In one embodiment, the first control signal may likewise be provided to the fifth transistor, and the second control signal may likewise be provided to the sixth transistor. An advantage of this embodiment is that one of the transistors from the set comprising the fifth transistor and the sixth transistor is switched to a very highly conductive operating state and a further transistor is safely switched to a nonconductive operating state, which means that the substrate voltage which can be tapped off at the supply connection has approximately the absolute value of the higher of the two supply voltages.

In one embodiment, the control circuit comprises a comparator and a driver circuit. The first and second supply voltages are provided to the comparator. The comparator is provided in order to ascertain which of the two supply voltages has a higher value. The output of the comparator is coupled to the driver circuit. The driver circuit is provided for the purpose of providing the first control signal for routing to the control connection of the first transistor and, if present, of the fifth transistor and the second control signal for routing to the control connection of the second transistor and, if present, of the sixth transistor.

In one embodiment, the comparator may comprise a first current source, to which the first supply voltage is provided, and a second current source, to which the second supply voltage is provided.

In one embodiment, the first and/or the second current source may comprise a current mirror. Advantageously, the number of series-connected current mirrors in the first current source is one different from the number of series-connected current mirrors in the second current source. A node at which the first and second current sources are merged may therefore be at a potential which has a high or a low value depending on whether the first supply voltage or the second supply voltage is the larger of the two supply voltages.

Advantageously, in one embodiment the comparator may have an adjustable hysteresis, which means that permanent switching or repeated switching to and fro between the first and second power sources is avoided.

In one embodiment, the driver circuit comprises a hold circuit. The driver circuit may be configured to produce the first and second control signal such that the first and second transistors are safely prevented from being in a conductive operating state at the same time. This advantageously ensures that a short circuit is prevented between the first and second current sources.

For the purpose of operating the control arrangement, it may be connected to the supply connection and to the reference potential connection.

In one embodiment, the circuit arrangement comprises at least one third input for supplying at least one third supply voltage, at least one seventh transistor which is connected between the at least one third input and the output and which comprises a substrate connection coupled to the supply connection, and at least one eighth transistor which is connected between the at least one third input and the supply connection. In this development, the input of the control circuit is coupled to the at least one third input and the output of the control circuit is coupled to a control connection of the at least one seventh transistor. One advantage of this development is that it means that the circuit arrangement is set up to select the output voltage from at least three supply voltages.

In one embodiment, a semiconductor body comprises the third and fourth transistors and also the control circuit and is processed using a CMOS integration technique or alternatively using a BICMOS integration technique. In this embodiment, the first and the second transistor are implemented using a manufacturing technology which is provided for power components.

In one alternative embodiment, a semiconductor body comprises the first, the second, the third and the fourth transistor and also the control circuit. In one embodiment, a semiconductor body comprises the first to sixth transistors and also the control circuit.

In one embodiment, a respective dedicated well is provided for the first to sixth transistors. In an alternative embodiment, a shared well is provided for at least two of the six transistors.

In one embodiment, a circuit arrangement for voltage selection comprises a first and a second transistor for selectively supplying a first or a second supply voltage to an output. In addition, the circuit arrangement comprises a third transistor which is used to provide the first supply voltage to a supply connection. In addition, the circuit arrangement comprises a fourth transistor which is used to provide the second supply voltage to the supply connection. The supply connection is connected to a substrate connection of the first and to a substrate connection of the second transistor. The circuit arrangement comprises a control circuit to supply a first control signal to a control connection of the first transistor and a second control signal to a control connection of the second transistor on the basis of a comparison between the first supply voltage and the second supply voltage.

In one embodiment of the circuit arrangement, a fifth and a sixth transistor may be provided to supply the first or the second supply voltage to the supply connection on the basis of the first and second control signals.

In one embodiment, the circuit arrangement for voltage selection can be used in a battery operated appliance. The circuit arrangement for voltage selection can be used to change over between a battery voltage connection and an output of a voltage regulator which can be coupled to a charger, and to provide the respective higher voltage for powering the electrical load in an appliance. The appliance may be a battery operated mobile radio communication appliance. A circuit arrangement for voltage selection may be used in a power management unit, PMU for short.

In an embodiment, a method for operating a circuit arrangement for voltage selection comprises comparing a first supply voltage and a second supply voltage, and taking the comparison result as a basis for routing a first control signal to a control connection of a first transistor and a second control signal to a control connection of a second transistor. The first and second control signals, and hence the comparison result, are taken as a basis for outputting the first supply voltage via the first transistor and/or the second supply voltage via the second transistor at an output.

One advantage of this embodiment is that the first and second transistors can be used for actively setting which of the two supply voltages is connected to the output to actively change over an output voltage between two supply voltages.

In one embodiment, the circuit arrangement can be configured such that apart from connections for supplying the first and second supply voltages and a connection to the reference potential connection it requires no other voltages to operate it.

In one embodiment, the circuit arrangement for voltage selection can automatically switch to and fro between the first and second supply voltages without the need to route control commands from outside of the circuit arrangement.

Although specific embodiments have been illustrated and described herein, it will be appreciated by those of ordinary skill in the art, that any arrangement which is calculated to achieve the same purpose may be substituted of the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention should, therefore, be determined with reference to the appended claims along with the scope of equivalents to which such claims are entitled.

It is emphasized that the Abstract is provided to comply with 37 C.F.R. section 1.72(b) requiring an abstract that will allow the reader to quickly ascertain the nature and gist of the technical disclosure. It is submitted with the understanding, that it will not be used to interpret or limit the scope or meaning of the claims.

The invention claimed is:

1. A circuit arrangement for voltage selection, comprising:
   a first input configured to receive a first supply voltage;
   a second input configured to receive a second supply voltage;
   an output configured to provide an output voltage;
   a first transistor connected between the first input and the output, and comprising a substrate connection coupled to a supply connection of the arrangement;
   a second transistor connected between the second input and the output, and comprising a substrate connection coupled to the supply connection;
   a third transistor connected between the first input and the supply connection;
   a fourth transistor connected between the second input and the supply connection; and
   a control circuit comprising inputs coupled to the first input and the second input, respectively, and comprising outputs coupled to a control connection of the first transistor and to a control connection of the second transistor, wherein the control circuit is configured to activate one of the first and second transistor based on a comparison of the first and second supply voltages;
   wherein the first and second transistors comprise normally-off field effect transistors;
   wherein the third transistor comprises a normally-off field effect transistor comprising a control connection coupled to the second input and a substrate connection coupled to the supply connection, and
   wherein the fourth transistor comprises a normally-off field effect transistor comprising a control connection coupled to the first input and a substrate connection coupled to the supply connection.

2. The circuit arrangement of claim 1, wherein the first and second transistors comprise power field effect transistors.

3. The circuit arrangement of claim 1, wherein the first and second transistors comprise a channel width to channel length ratio that is larger than a channel width to channel length ratio of the third and fourth transistors.

4. The circuit arrangement of claim 1, wherein the third transistor and the fourth transistor comprise a threshold voltage having an absolute value lower than that of a threshold voltage of the first transistor and the second transistor.

5. The circuit arrangement of claim 1, further comprising:
   a fifth transistor connected between the first input and the supply connection; and
   a sixth transistor connected between the second input and the supply connection;
   wherein the outputs of the control circuit are coupled to a control connection of the fifth transistor and to a control connection of the sixth transistor, respectively.

6. The circuit arrangement of claim 1, wherein the control circuit comprises a comparator comprising inputs coupled to the first and second inputs, respectively, and a driver circuit connected downstream of the comparator and operably coupled thereto, and comprising outputs coupled to the control connection of the first transistor and to the control connection of the second transistor, respectively.

7. The circuit arrangement of claim 6, wherein the comparator comprises:
   a first current source comprising an input coupled to the first input; and
   a second current source comprising an input coupled to the second input.

8. The circuit arrangement of claim 6, wherein the comparator is configured to comprise an adjustable hysteresis, thereby preventing a change in an output thereof based on brief fluctuations at the inputs having durations less than a predetermined threshold.

9. The circuit arrangement of claim 6, wherein the driver circuit comprises two cross-coupled NAND gates.

10. The circuit arrangement of claim 1, wherein the circuit arrangement comprises a hold capacitor connected between the supply connection and a reference potential connection.

11. A circuit arrangement for voltage selection, comprising:
    a first input configured to receive a first supply voltage;
    a second input configured to receive a second supply voltage;
    an output configured to provide an output voltage;
    a first transistor connected between the first input and the output, and comprising a substrate connection connected to a supply connection of the arrangement;
    a second transistor connected between the second input and the output, and comprising a substrate connection connected to the supply connection;
    a third transistor connected between the first input and the supply connection;
    a fourth transistor connected between the second input and the supply connection; and
    a control circuit comprising inputs coupled to the first input and the second input, respectively, and to the supply connection, and comprising outputs coupled to a control connection of the first transistor and to a control connection of the second transistor, respectively;
    wherein the third transistor comprises a control connection connected to the second input of the circuit arrangement and the fourth transistor comprises a control connection connected to the first input of the circuit arrangement.

12. The circuit arrangement of claim 11, wherein
    the substrate connection of the first transistor is directly connected to the supply connection (26) and the substrate connection of the second transistor is directly connected to the supply connection.

13. The circuit arrangement of claim 11, wherein the substrate connection of the first transistor is permanently connected to the supply connection and the substrate connection of the second transistor is permanently connected to the supply connection.

14. A circuit arrangement for voltage selection, comprising:
- a first and a second transistor configured to selectively supply a first supply voltage or a second supply voltage, respectively, to an output;
- a third and a fourth transistor configured to supply the first supply voltage or the second supply voltage to a supply connection that is connected to a substrate connection of the first transistor and to a substrate connection of the second transistor;
- a control circuit configured to supply a first control signal to a control connection of the first transistor, and a second control signal to a control connection of the second transistor based on a comparison between the first supply voltage and the second supply voltage;
- a fifth transistor configured to supply the first supply voltage to the supply connection based on the first control signal; and
- a sixth transistor configured to supply the second supply voltage to the supply connection based on the second control signal.

15. The circuit arrangement of claim 14, wherein the control circuit is coupled to the supply connection to supply power to the control circuit.

16. The circuit arrangement of claim 14, in combination with a battery operated appliance configured to receive one of the first and second supply voltage of the circuit arrangement for operation thereof.

17. The circuit arrangement in combination with the battery operated appliance of claim 16, wherein the battery operated appliance comprises a battery operated mobile radio communication appliance configured to change over between a battery voltage connection and a coupleable charger as the respective first and second supply voltages.

18. A method for operating a circuit arrangement for voltage selection, comprising:
- comparing a first supply voltage with a second supply voltage, and supplying a first control signal to a control connection of a first transistor and a second control signal to a control connection of a second transistor based on a comparison result;
- supplying the first supply voltage via the first transistor or the second supply voltage via the second transistor to an output based on the first and second control signals;
- supplying a substrate voltage based on the first supply voltage using a third transistor and based on the second supply voltage using a fourth transistor;
- supplying the substrate voltage to a substrate connection of the first transistor and to a substrate connection of the second transistor; and
- wherein a control connection of the third transistor is connected to the second input of the circuit arrangement and a control connection of the fourth transistor is connected to the first input of the circuit arrangement.

19. The method of claim 18, wherein the substrate connection of the first transistor is permanently connected to the substrate connection of the second transistor.

20. The method of claim 18, further comprising increasing an absolute value of the substrate voltage by supplying the first supply voltage via a fifth transistor or the second supply voltage via a sixth transistor to the substrate voltage based on the first and second control signals.

* * * * *